(12) United States Patent
Kim et al.

(10) Patent No.: US 7,518,647 B2
(45) Date of Patent: Apr. 14, 2009

(54) IMAGE SENSOR FOR REMOVING HORIZONTAL NOISE

(75) Inventors: Young-Jin Kim, Chungcheongbuk-do (KR); Nam-Ryeol Kim, Chungcheongbuk-do (KR)

(73) Assignee: MagnaChip Semiconductor, Ltd., Chungcheonbuk-Do (KR)

( * ) Notice: Subject to any disclaimer, the term of this patent is extended or adjusted under 35 U.S.C. 154(b) by 586 days.

(21) Appl. No.: 11/260,900

(22) Filed: Oct. 28, 2005

(65) Prior Publication Data

US 2006/0109362 A1 May 25, 2006

(30) Foreign Application Priority Data

Oct. 30, 2004 (KR) ............... 10-2004-0087686
Sep. 9, 2005 (KR) ............... 10-2005-0084261

(51) Int. Cl.
*H04N 5/335* (2006.01)
*H04N 5/217* (2006.01)

(52) U.S. Cl. .................. 348/308; 348/241

(58) Field of Classification Search ........... 348/308, 348/241, 194, 533, 607
See application file for complete search history.

(56) References Cited

U.S. PATENT DOCUMENTS

| | | | | |
|---|---|---|---|---|
| 5,397,978 A | * | 3/1995 | Parry et al. ............... 323/280 |
| 5,880,460 A | * | 3/1999 | Merrill ............... 250/208.1 |
| 5,917,547 A | * | 6/1999 | Merrill et al. ............... 348/301 |
| 5,920,166 A | * | 7/1999 | Schlager et al. ........ 318/400.19 |
| 5,923,369 A | * | 7/1999 | Merrill et al. ............... 348/301 |
| 6,211,659 B1 | * | 4/2001 | Singh ............... 323/315 |
| 6,507,245 B2 | * | 1/2003 | Tai ............... 330/255 |
| 6,580,063 B1 | * | 6/2003 | Okamoto ............... 250/208.1 |
| RE38,499 E | * | 4/2004 | Merrill et al. ............... 348/301 |
| 6,943,786 B1 | * | 9/2005 | Birk et al. ............... 345/204 |
| 7,046,077 B2 | * | 5/2006 | Ozasa et al. ............... 327/541 |
| 7,046,284 B2 | * | 5/2006 | Kozlowski et al. ............... 348/308 |
| 7,053,695 B2 | * | 5/2006 | Ozasa et al. ............... 327/541 |
| 2003/0107661 A1 | * | 6/2003 | Pahr et al. ............... 348/244 |
| 2006/0061413 A1 | * | 3/2006 | Kim et al. ............... 327/543 |
| 2006/0220459 A1 | * | 10/2006 | Kulasekeram ............... 307/11 |

* cited by examiner

*Primary Examiner*—Lin Ye
*Assistant Examiner*—Marly Camargo
(74) *Attorney, Agent, or Firm*—Blakely, Sokoloff, Taylor & Zafman LLP (57) ABSTRACT

Disclosed herein is an image sensor for removing a horizontal noise. The image sensor includes a pixel array including a plurality of unit pixels located at every row or column; an analog bus located at every row or column, for transferring output signals of the pixel array; and a readout circuit for reading the output signals of the pixel array loaded on the analog bus, wherein the readout circuit includes: a plurality of first transistors having a drain connected to the column analog bus and a source connected to a supply voltage; and a second transistor having a drain connected to a gate of the second transistor and gates of the first transistors, and a source connected to the supply voltage, wherein, a size of the second transistor is larger than a size of the first transistor.

5 Claims, 7 Drawing Sheets

IMAGE SENSOR FOR REMOVING HORIZONTAL NOISE

FIELD OF THE INVENTION

The present invention relates to an image sensor; and, more particularly, to an image sensor with a high resolution for removing a horizontal noise in a complementary metal oxide semiconductor (CMOS) image sensor or bulk charge modulated device (BCMD) image sensor.

BACKGROUND OF THE INVENTION

In general, a conventional image sensor is mainly used in a CIF(common intermediate format) scale composed of 352 pixels×288 pixels, or a VGA (video graphic array) scale composed of 640 pixels×480 pixels. Recently, the image sensor for high resolution greater than one Mega-pixel is mainly traded in an image sensor market. As resolution of the image sensor is greater than one Mega- pixel, new problems not shown in the conventional CIF scale and VGA scale have issued.

Generally, noises occurred in the image sensor can be mainly classified into a vertical noise and a horizontal noise. The vertical noise caused by a fixed pattern noise (FPN) can be mainly removed by a correlated double sampling (CDS) technique. On the other hand, the horizontal noise occurred in the high resolution image sensor is caused by parasitic capacitances between a gate and a drain of each load transistor. Hence, it is hard to remove the horizontal noise.

Figure 1:
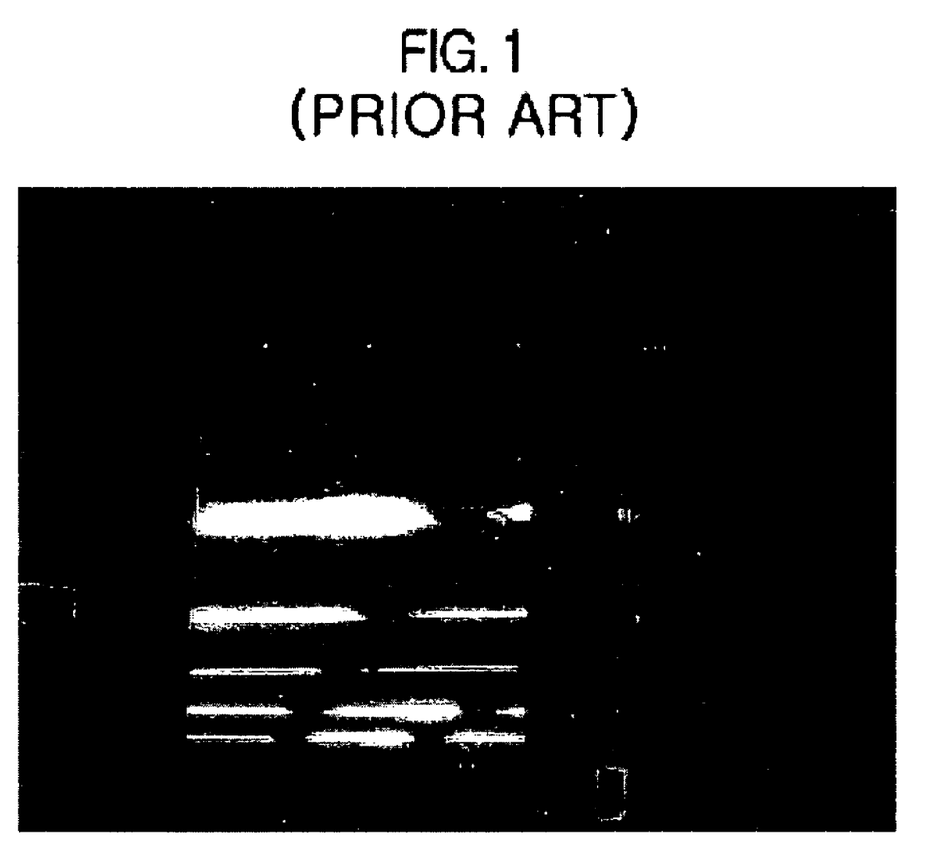
FIG. 1 is a picture showing a horizontal noise occurred in a 1.3 mega-pixel product on developing.

FIG. 1 is a picture showing a horizontal noise occurred in a 1.3 mega-pixel product on developing.

As shown in FIG. 1, the horizontal noise appears in a region of a bright object on screen according to a horizontal direction. The horizontal noise occurs because pixels located in a row including the predetermined pixel corresponding to the bright object are smaller than neighboring pixels located in upper or lower rows of the predetermined pixel corresponding to the bright object.

The horizontal noise occurs in the image sensor for high resolution more than one Mega-pixel because load transistors operated by a bias current increase more than conventional load transistors to thereby increase total parasitic capacitances between gates and drains of load transistors.

This structural problem can be improved by increasing the bias current, however the current of each column analog bus also increases accordingly to thereby decrease a dynamic range of the pixels and deteriorate an optic characteristics.

SUMMARY OF THE INVENTION

It is, therefore, an object of the present invention to provide an image sensor for removing a horizontal noise by adjusting a size of an active transistor and load transistors forming a current mirror with the active transistor in a readout circuit of the image sensor.

In an aspect of the present invention, there is provided an image sensor including a pixel array including a plurality of unit pixels located at every row or column; an analog bus located at every row or column, for transferring output signals of the pixel array; and a readout circuit for reading the output signals of the pixel array loaded on the analog bus, wherein the readout circuit includes: a plurality of first transistors having a drain connected to the column analog bus and a source connected to a supply voltage; and a second transistor having a drain connected to a gate of the second transistor and gates of the first transistors, and a source connected to the supply voltage, wherein, a size of the second transistor is larger than a size of the first transistor.

In accordance with another aspect of the present invention, there is provided an image sensor including a pixel array including a plurality of unit pixels located at every row or column; an analog bus located at every row or column for transferring output signals of the pixel array; and a readout circuit for reading the output signals of the pixel array loaded on the analog bus, wherein the readout circuit includes: a plurality of first transistors having a drain connected to the column analog bus and a source connected to a supply voltage; and a second transistor having a drain connected to a gate of the second transistor and gates of the first transistors, and a source connected to the supply voltage, wherein an amount of the second current is larger than an amount of the first current.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, an image sensor in accordance with the present invention will be described in detail referring to the accompanying drawings.

Figure 2:
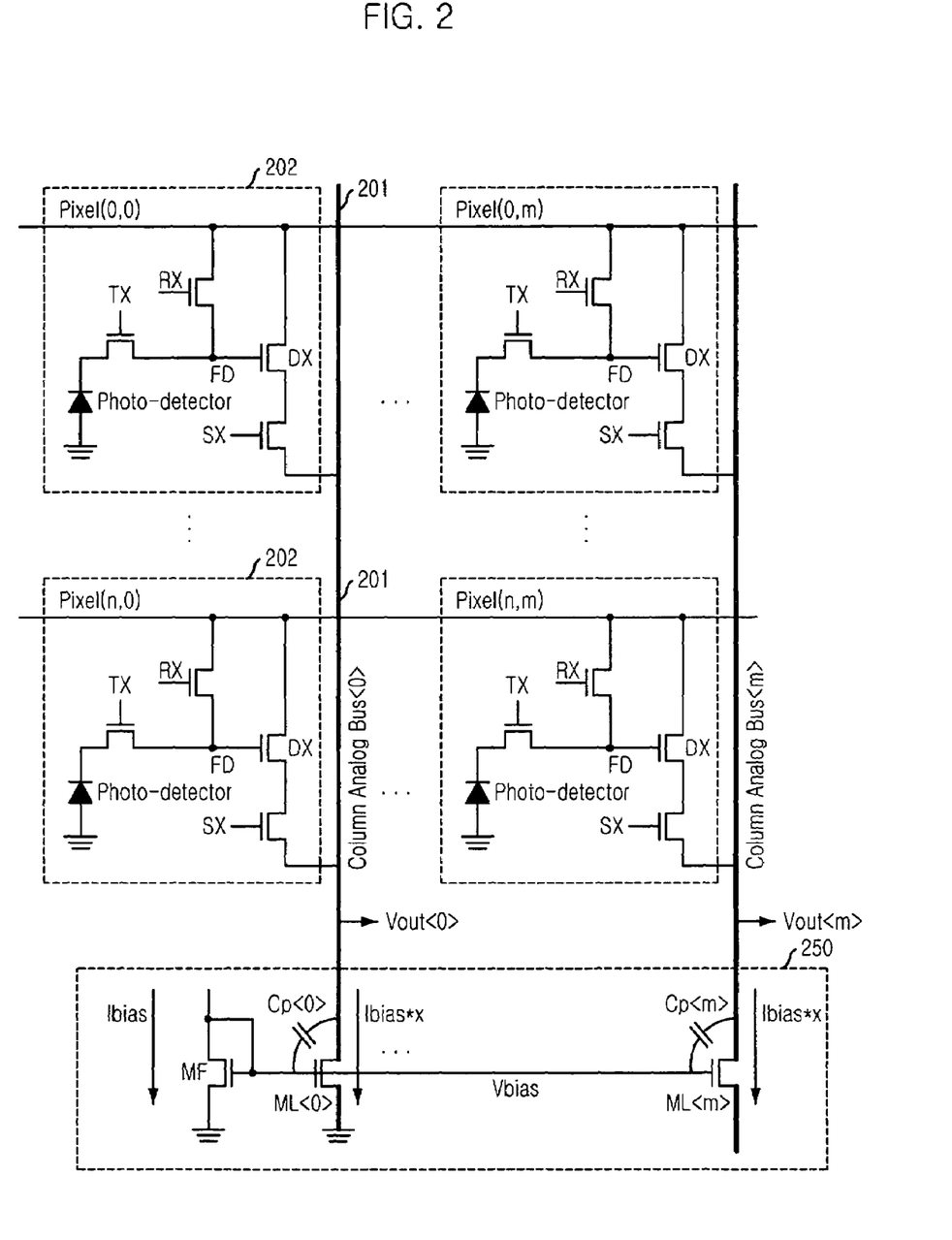
FIG. 2 is a block diagram describing an image sensor having an m×n pixel array in accordance with an embodiment of the present invention.

FIG. 2 is a block diagram describing an image sensor having an n×m pixel array in accordance with an embodiment of the present invention.

Referring to FIG. 2, the image sensor includes the pixel array and a readout circuit 250.

The pixel array includes a column analog bus 201 and a unit pixel 202. Also, the pixel array includes an n×m matrix. The m is a number of columns and the n is a number of rows. The readout circuit 250 is connected with the unit pixel 202 and gets a data from unit pixels 202 through a column analog bus 201.

Generally the image sensor for high resolution greater than one mega-pixel comprises the n×m pixel array, wherein the numbers of columns, i.e., m, are greater than 1024. Hence, the unit pixels greater than 1024 columns are stationed along a row direction. The image sensor includes a correlated double sampling (CDS) block (not shown) including CDS circuits at each column. When the image sensor reads pixel data, the pixel data arranged along one row of the pixel array are transferred to the CDS circuits of the CDS block at the same time or at the same clock cycle. Output signals of the CDS circuits are sequentially transferred to the analog signal processor (not shown) in response to the column address.

It is well known by people skilled in the art that a structure shown in FIG. 2 is a row-based scan method.

In the other hand, a column-based scan method includes a row analog bus, instead of the column analog bus. So, if one of the columns is selected during scanning, pixel data of the selected column is outputted through the row analog bus.

The unit pixel 202 is provided with a photodiode operated as a photo-detector (PD) and four transistors.

The PD generates photo-electric charges in response to an inputted light. The four transistors are a transfer transistor Tx, a reset transistor Rx, a drive transistor Dx and a select transistor Sx. The transfer transistor Tx transfers photo-electric charges collected by the PD to a floating diffusion node FD. The reset transistor Rx sets a potential of the floating diffusion node FD as a reasonable value and resets the voltage of the floating diffusion node FD by outputting charges stored in the floating diffusion node FD. The drive transistor Dx operates as a source flower buffer amplifier by applying the potential of the floating diffusion node FD to a gate. The select transistor Sx operates as a switch so as to transfer the potential of the floating diffusion node FD applied to the gate of the drive transistor Dx to the column analog bus 201.

For more details about an operation of the image sensor, an operation of the unit pixel is as follows.

First, the voltage of the floating diffusion node FD is reset by turning on the reset transistor Rx. A required unit pixel 202 is selected by turning on the select transistor Sx. A first output voltage V1 outputted from the drive transistor Dx is measured.

Continuously, the transfer transistor Tx is turned on. Herein, all of the photo-electric charges integrated in the PD is transferred to the floating diffusion node FD. The transfer transistor Tx is turned off. A second output voltage V2 outputted from the drive transistor Dx is measured.

A voltage difference between the first output voltage V1 and the second output voltage V2 is generated. The voltage difference (V1-V2) is generated based on the photo-electric charges and is a pure value of the pixel data.

Herein, the readout circuit 250 connected with the column analog bus 201 is for reading the first output voltage V1 and the second output voltage V2, and the CDS block including the CDS circuit is for sampling the first output voltage V1 and the second output voltage V2 which are read by the readout circuit 250.

The readout circuit 250 includes an active transistor MF and a plurality of load transistors ML<m:0>. Each of load transistors ML<m:0> is connected with each unit pixel 202 through the column analog bus 201. The active transistor MF is located at every row and forms current mirrors with the load transistors ML<m:0>.

In the mean time, the conventional readout circuit is designed to make a size ratio of the load transistor ML and the active transistor MF be 1:1. Herein, the size ratio of the load transistor ML and the active transistor MF means a ratio of the size of the load transistor ML to the size of the active transistor MF. Hence, in case that the size ratio of the load transistor ML and the active transistor MF is 1:1, the same currents flow on the column analog bus 201.

In the above-mentioned operation, a voltage of each PD is determined by a brightness of lights in the neighborhood. For example, the PD exposed to a bright light has a low voltage and the PD exposed to a dark light has a high voltage.

The voltage of the floating diffusion node FD has a source-follower structure by each driver transistor Dx of the unit pixel 202 and each of load transistors ML<m:0> of the readout circuit 250. An output voltage Vout of each column analog bus 201 is determined by the voltage of the floating diffusion node FD and a bias current Ibias flowing on the load transistors ML<m:0>.

Figure 3:
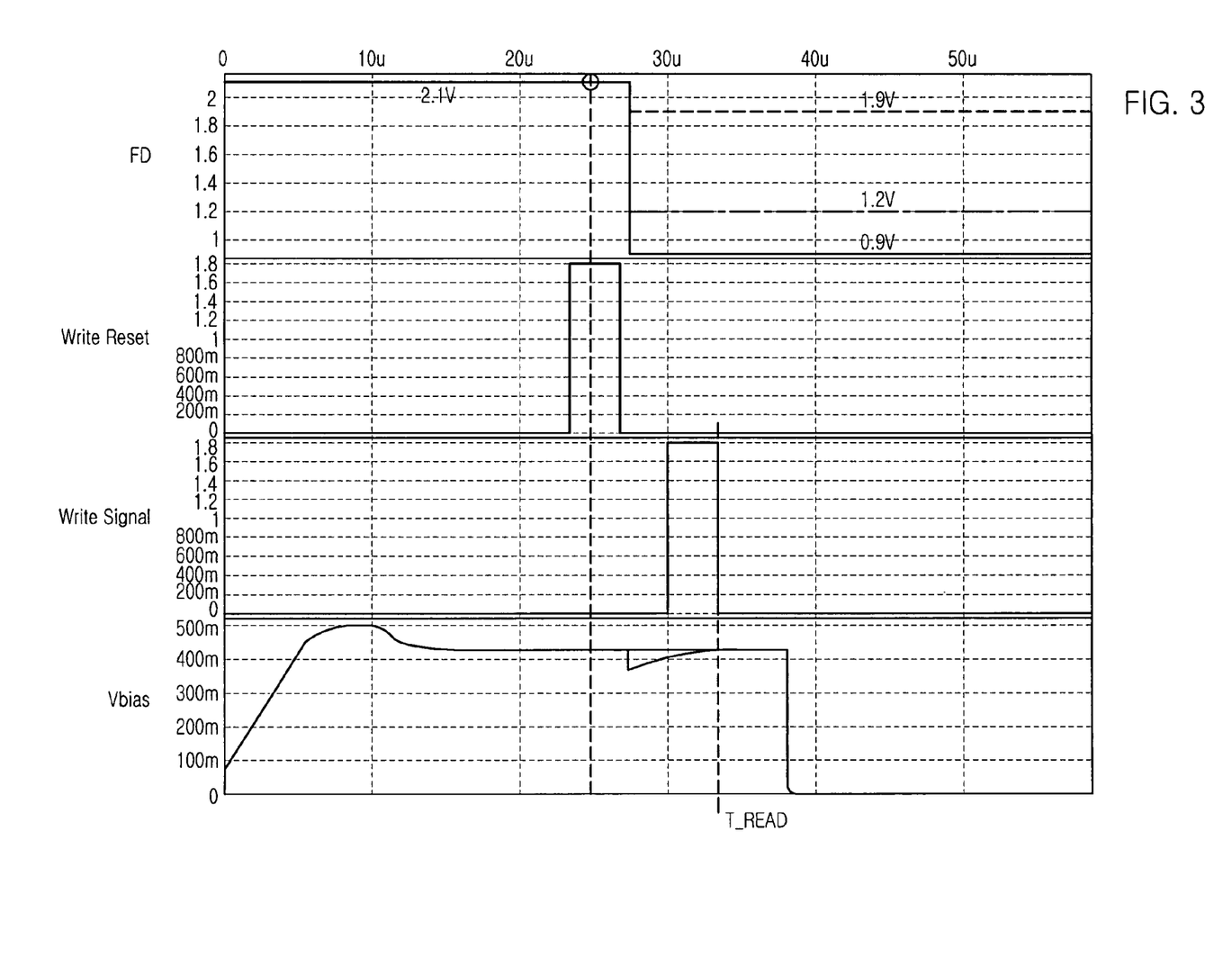
FIG. 3 is a timing chart illustrating a voltage of a floating diffusion node and a bias voltage when a size ratio of a load transistor and an active transistor is 1:1.

FIG. 3 is a timing chart illustrating a voltage of a floating diffusion node and a bias voltage when a size ratio of a load transistor and an active transistor is 1:1.

Referring to FIG. 3, as described in FIG. 2, first, the voltage of the floating diffusion node FD is reset by turning on the reset transistor Rx. The required unit pixel is selected by turning on the select transistor Sx and a first output voltage V1 outputted from the drive transistor Dx is measured in response to an activation period of a Write Reset signal in FIG. 3. Here, as shown in FIG. 3, the first output voltage V1 is about 2.1 V.

Continuously, the transfer transistor Tx is turned on after a predetermined time. All the photo-electric charges integrated in the PD is transferred to the floating diffusion node FD and a second output voltage V2 outputted from the drive transistor Dx is measured in response to an activation period of a Write Signal in FIG. 3. Here, as shown in FIG. 3, the second output voltage V2 is about 1.9V, 1.2V or 0.9V.

Then, it is possible to get a pure value of the pixel data by calculating a voltage difference between the first output voltage V1 and the second output voltage V2.

In the aforesaid statements, a bias voltage Vbias, which is a gate operation voltage of the load transistors ML<m:0>, is only affected with the bias current Ibias of the active transistor MF constituted with the readout circuit. Further, the bias voltage Vbias is varied according to an overlap capacitance during an output voltage Vout of each column analog bus changes the first output voltage V1 into the second output voltage V2. Herein, the overlap capacitance is a parasitic capacitance Cp between the column analog bus connected with a drain of the load transistor ML and gates of the load transistors ML<m:0>. Accordingly, at the time of sampling the second output voltage V2, i.e., T_READ in FIG. 3, the bias voltage Vbias can not be stabilized to thereby appear a horizontal noise on screen.

Namely, as stated above, the horizontal noise occurs in the image sensor for high resolution more than one mega-pixel because the number of parasitic capacitances Cp<m:0> between gates and drains of load transistors ML<m:0> are increased.

Figure 4:
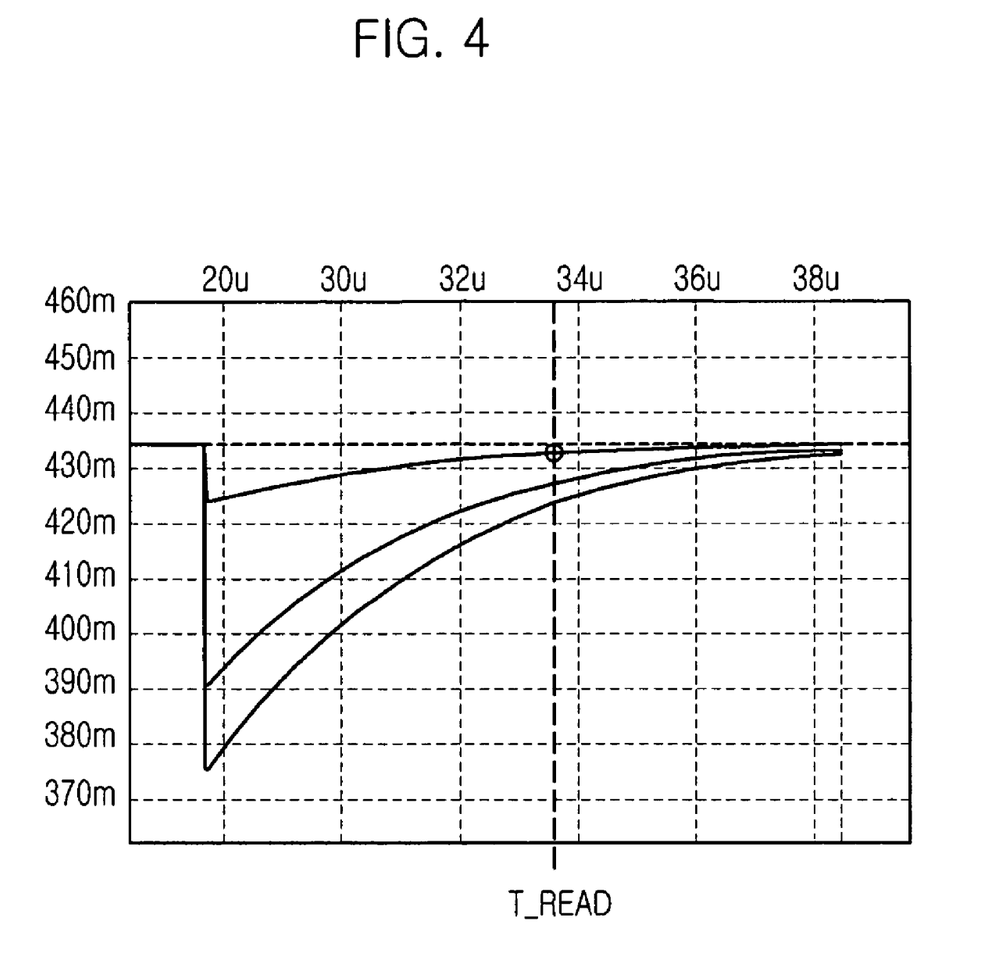
FIG. 4 is an enlarged timing chart showing the bias voltage shown in FIG. 3.

FIG. 4 is an enlarged timing chart showing the bias voltage shown in FIG. 3.

As shown in FIG. 4, as a variation of the output voltage Vout at the column analog bus is higher, a variation of the bias voltage Vbias becomes higher. Also, as the variation of the bias voltage Vbias is higher, the bias voltage Vbias becomes lower. As the bias voltage Vbias is lower, the bias current Ibias flowing the source-drain of the load transistors<m:0> becomes smaller. As a decrease of the bias current Ibias, a gate-source voltage Vgs of the driver transistor Dx is reduced.

Accordingly, a sampling value of a predetermined pixel having the horizontal noise, which is based on the voltage difference between the first output voltage V1 and the second output voltage V2, is smaller than that of normal pixels. As a result, the horizontal noise appears on screen.

Moreover, the reason why the bias voltage Vbias can not be stabilized sooner than a conventional CIF scale or VGA scale is that capacitive loads of the image sensor for high resolution more than one mega-pixel, operated by the bias current Ibias, increase more than those of the conventional CIF scale or VGA scale. That is, in the image sensor for high resolution more than one mega-pixel, a resolution in the horizontal direction dramatically increases and, as a result, the capacitive loads including a gate capacitance of the active transistor MF, gate capacitances of all load transistors ML<m:0> and parasitic capacitances Cp<m:0> of each bias voltage Vbias node are increased.

The above-mentioned horizontal noise can be removed by increasing the bias current Ibias flowing the load transistor ML constituted with the readout circuit. However the increase of the bias current Ibias induces a current at each column analog bus to increase. Accordingly, a dynamic range of the pixels decreases and an optic characteristics deteriorates.

Consequently, in an embodiment of the present invention, a size of the active transistor MF in the readout circuit 250 is increased by multiplying A by ML_SIZE. Hence, a current flowing from a drain to a source of the active transistor MF increases by multiplying A by the bias current Ibias. Where, the ML_SIZE is a size of the load transistor ML, the bias current Ibias is a current flowing from a drain to a source of the load transistor ML, and A is defined as a real number greater than 1.

In particularly, the load transistor ML of the readout circuit 250 has a drain connected to the column analog bus 201 and a source connected to a ground voltage. Also, the active transistor ME has a drain connected to a gate of the active transistor ME and gates of the load transistors ML<m:0>, and a source connected to a ground voltage. Also, in the present, the size of the active transistor ME is larger than the size of the load transistor ML. It is well known by people skilled in the art that a size of transistor depends on a W/L (width to length) ratio.

Therefore, the bias voltage Vbias is quickly stabilized and the horizontal noise can be solved without affecting the optic characteristics and, at the same time, the bias current Ibias flowing on the column analog bus is the same level of that in conventional image sensor.

Figure 5:
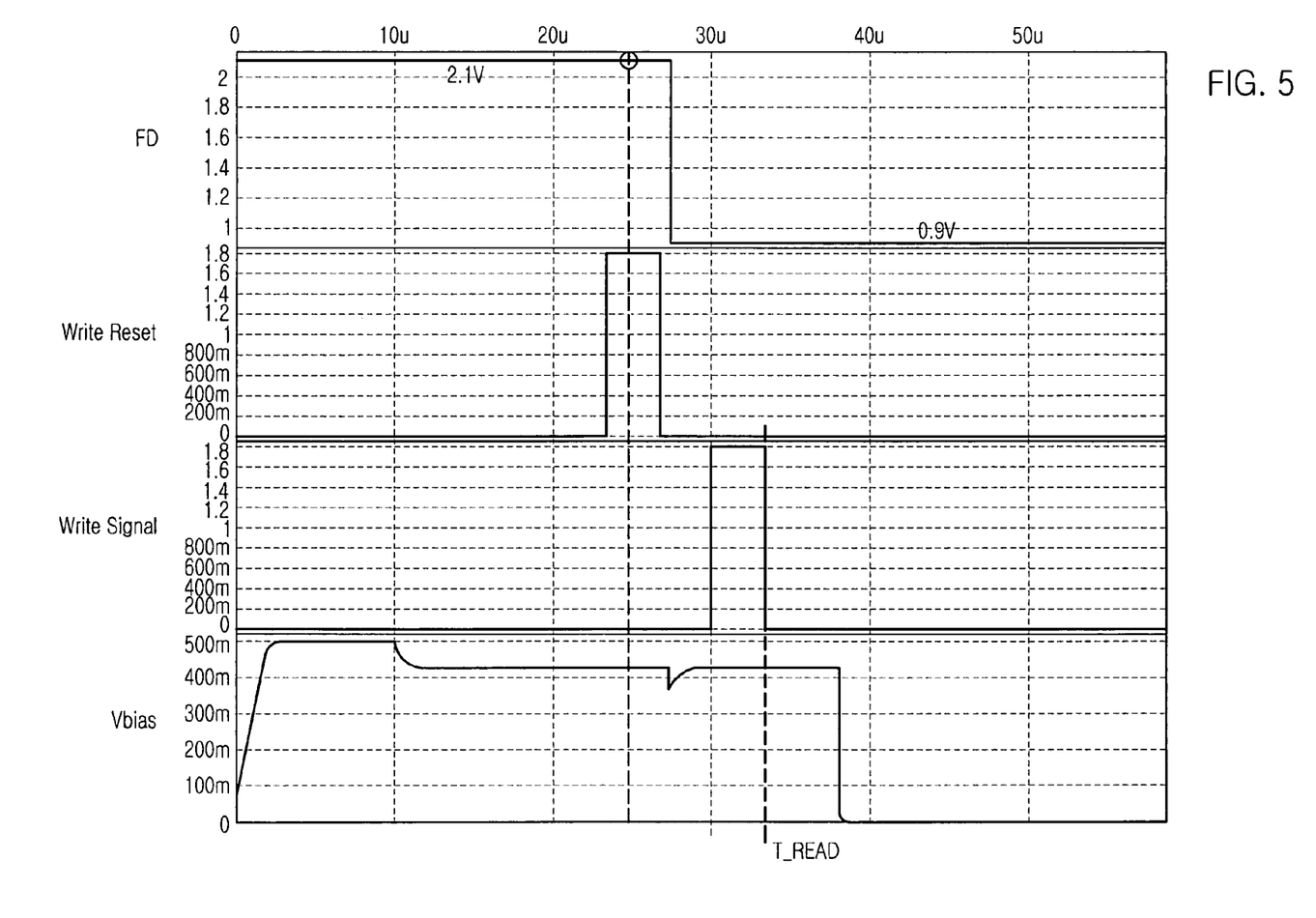
FIG. 5 is a timing chart illustrating a voltage of a floating diffusion node and a bias voltage when a size ratio of a load transistor and an active transistor is 1:5.

FIG. 5 is a timing chart illustrating a voltage of a floating diffusion node and a bias voltage when a size ratio of a load transistor and an active transistor is 1:5.

More particularly, FIG. 5 is the timing chart of the voltage of the floating diffusion node FD and the bias voltage Vbias in the readout circuit when a size ratio of the load transistor ML and the active transistor MF is 1:5, i.e., A is 5.

Referring to FIG. 5, the voltage of the floating diffusion node FD and the bias voltage Vbias is more stable than those of FIG. 3. Namely, at the time of sampling a second output voltage V2, i.e., T_READ in FIGS. 3 to 5, the voltage of the floating diffusion node FD of FIG. 3 swings from 1.9 V to 0.9 V. On the other hand, the voltage of the floating diffusion node FD of FIG. 5 is merely varied so as to be stabilized at about 0.9 V. Accordingly, at the time of sampling a second output voltage V2, i.e., T_READ in FIGS. 3 to 5, the bias voltage Vbias of FIG. 5 is more stable than those of FIGS. 3 and 4.

As described above, according to the embodiment of the present invention, the size ratio of the load transistor ML is set to the bias current Ibias and ML_SIZE to make a current flowing on the column analog bus be same as before. At the same time, the size ratio of the active transistor MF is set to multiplying A by ML_SIZE to thereby set the current of the active transistor as a value of multiplying A by the bias current Ibias. Where, A is a real number more than 1. Hence, the bias voltage Vbias is quickly stabilized and the horizontal noise can be solved without affecting the optic characteristics.

Figure 6A:
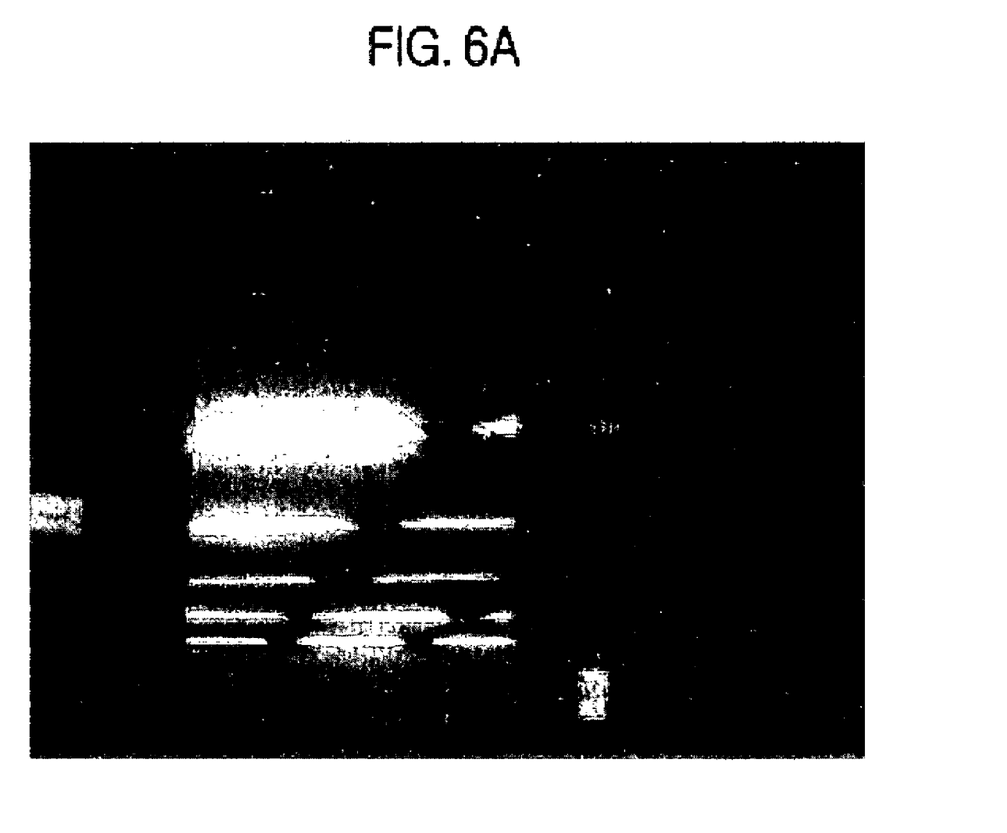
FIG. 6A is a picture showing a horizontal noise when a size ratio of a load transistor and an active transistor is 1:1.
Figure 6B:
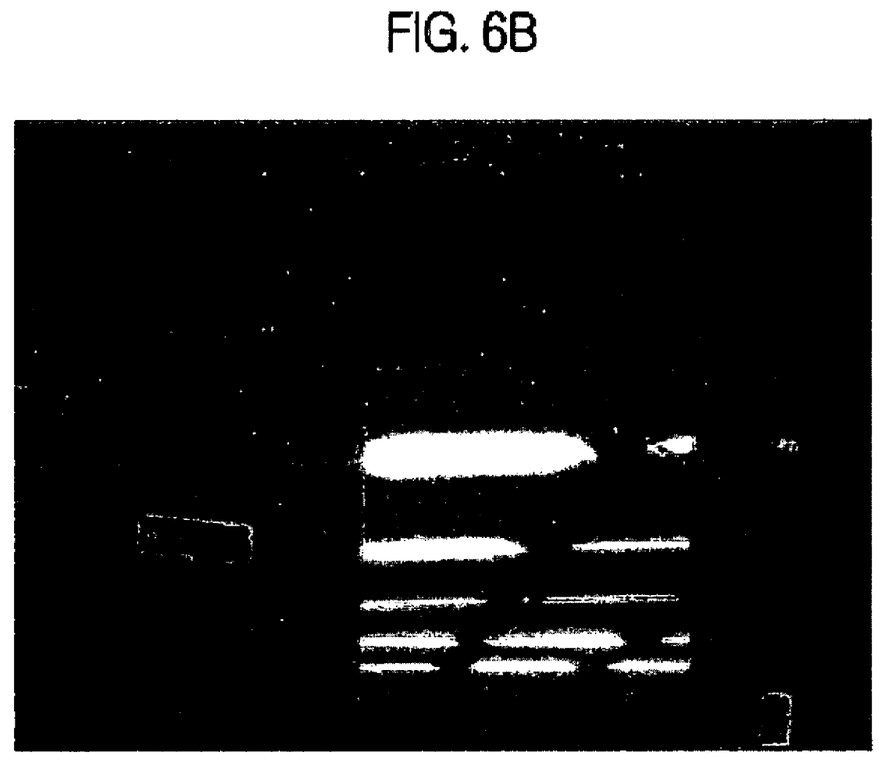
FIG. 6B is a picture showing a horizontal noise when a size ratio of a load transistor and an active transistor is 1:5.

FIGS. 6A and 6B are pictures comparing a horizontal noise according to the conventional readout circuit with a horizontal noise according to an embodiment of the present invention.

More particularly, FIG. 6A is a picture in case that a size ratio of a load transistor ML and an active transistor MF is 1:1, and FIG. 6B is a picture in case that a size ratio of the load transistor ML and the active transistor MF is 1:5 according to the present invention.

Referring to FIGS. 6A and 6B, a horizontal noise shown in the picture of FIG. 6B is improved more than a horizontal noise shown in the picture of FIG. 6A.

According to another embodiment of the present invention, a size ratio of the active transistor MF is set to ML_SIZE. At the same time, a size ratio of the load transistor ML is set to a value of dividing ML_SIZE by A. Where, A is defined as a real number more than 1. So, it is possible to flow the uniform bias current Ibias on a column analog bus.

In this case, all structures of the load transistors ML<m:0> located at every column should be changed. However, when the load transistors ML<m:0> are designed as a finger type, it is possible to easily implement the embodiment of the present invention by adjusting the size by processing optionally a metal wiring.

As described above, the image sensor of the present invention removes a horizontal noise by adjusting a size ratio of an active transistor and load transistors forming current mirrors with the active transistor in a readout circuit of the image sensor.

Besides, the present invention can be applied to all types of image sensors having a readout circuit such as a complementary metal oxide semiconductor (CMOS) image sensor or bulk charge modulated device (BCMD) image sensor.

The present application contains subject matter related to Korean patent application No. 2004-87686, filed in the Korean Patent Office on Oct. 30, 2004, and Korean patent application No. 2005-84261, filed in the Korean Patent Office on Sep. 9, 2005, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An image sensor, comprising:
   a pixel array including a plurality of unit pixels located at every row or column;
   an analog bus located at every row or column for transferring output signals of the pixel array; and
   a readout circuit for reading the output signals of the pixel array loaded on the analog bus,
   wherein the readout circuit includes:
   a plurality of first transistors having a drain connected to the column analog bus and a source connected to a supply voltage; and
   a second transistor having a drain connected to a gate of the second transistor and gates of the first transistors, and a source connected to the supply voltage,
   wherein a size of the second transistor is larger than a size of each of the first transistors, and a current amount flowing through the second transistor is larger than a current amount flowing through the first transistors.

2. The image sensor as recited in claim 1, wherein the first transistors are located at every row and the second transistor forms current mirrors with the first transistors.

3. The image sensor as recited in claim 1, wherein the first transistors are located at every column and the second transistor forms current mirrors with the first transistors.

4. The image sensor as recited in claim 1, wherein the first transistors and the second transistor are NMOS transistor.

5. The image sensor as recited in claim 1, wherein the supply voltage is a ground voltage.

* * * * *